Figure 1:
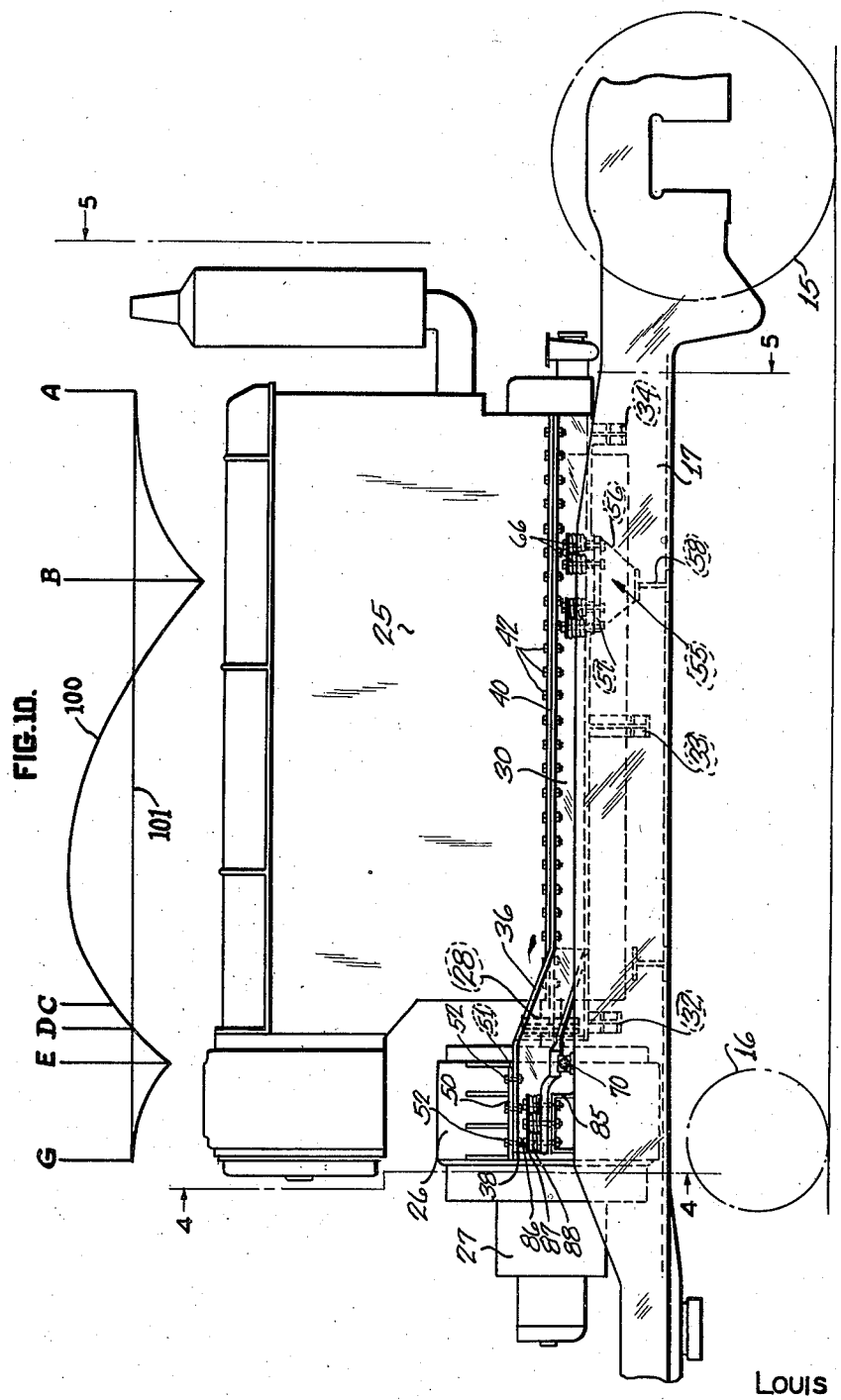

Feb. 11, 1941.　　　L. E. ENDSLEY　　　2,231,260
POWER UNIT MOUNTING MEANS
Filed June 13, 1938　　　3 Sheets-Sheet 1

INVENTOR
LOUIS E. ENDSLEY
BY Paul L. Kisker
ATTORNEY

Feb. 11, 1941.   L. E. ENDSLEY   2,231,260
POWER UNIT MOUNTING MEANS
Filed June 13, 1938   3 Sheets-Sheet 2

INVENTOR
LOUIS E. ENDSLEY
BY
ATTORNEY

INVENTOR
LOUIS E. ENDSLEY
ATTORNEY

Patented Feb. 11, 1941

2,231,260

UNITED STATES PATENT OFFICE 2,231,260

POWER UNIT MOUNTING MEANS

Louis E. Endsley, Pittsburgh, Pa., assignor to Fairbanks, Morse & Co., Chicago, Ill., a corporation of Illinois Application June 13, 1938, Serial No. 213,543

4 Claims. (Cl. 105—35)

This invention relates to improvements in power unit mounting means, and more particularly to an improved supporting and mounting assembly for direct-connected power units, such as engine-generator assemblies, and is especially adapted for the installation of such power assemblies in railway vehicles or locomotives.

Considerable difficulty has heretofore been experienced in the mounting of relatively heavy engine-generator units, as in Diesel-electric locomotives, in that many obstacles arise from a direct-bolted securement of the engine and generator directly to the underframe of the vehicle, such as a car or locomotive. The adverse effects heretofore experienced are due in part to the fact that the frame of the locomotive or vehicle usually possesses a considerably higher elasticity than do the frame and base portions of the engine. It results from this, than in cases wherein the frame of the engine is directly rigidly secured to the underframe of a locomotive, inordinate stresses are produced in the engine bed and base structure, resulting at times, in distortion, misalignment or deformation of the lower portions of the engine as a result of which considerable engine bearing trouble is encountered. It is further obviously desirable to utilize, for compactness and minimization of torsional stresses, a direct-connected, close-coupled engine and generator assembly, the generator being positively connected, usually through some form of flexible coupling, to the engine crankshaft. In such an arrangement, it is obviously desirable to maintain, as closely as possible, the original intended axial alignment of the engine and the generator so as to minimize flexing of the flexible coupling structure. The present engine has for its general object improvements in the mounting of an engine, or of an engine-generator assembly for example, in a vehicle or on a comparable support, whether stationary or movable, which may at times be subjected to twisting, warping or bending stresses.

Yet another object of the invention is attained in an improved intermediate mounting structure to which the power plant is assembled, and which in turn is so connected to the vehicle frame structure as to result in a considerably reduced overall weight of frame and power plant, and at the same time avoiding the transfer of bending or twisting stresses from the vehicle frame, to the engine proper, whereby the alignment of the engine bearings can never be impaired as a result of any shocks or stresses at all likely to be encountered in the vehicle or locomotive frame.

Yet another object of the invention may be stated, somewhat differently than the foregoing, as attained in the provision of a mounting agency for engines, particularly adapted for internal combustion engines of in-line type, such that the power plant structure is anchored securely in a manner to meet all practical assembly requirements, and yet is free to the extent to permit both endwise and lateral thermal expansion, within any reasonable or expected limits.

More specifically indicated with respect to the example chosen for the present disclosure, the invention has for an object the provision of an improved mounting cradle for structural disposition between a combustion engine and the frame of a locomotive powered thereby, such that any except abnormal warping or bending stresses of the locomotive frame are prevented from imparting any harmful twisting or bending stresses to the power plant or prime mover.

Still more particularly stated, the invention is realized in preferred form, in the provision of an engine mounting cradle for locomotives and the like, which combines the advantages of a pivotal connection with those of a slidable form of connection between the power plant and the underframe or sub-structure of the locomotive or vehicle.

Figure 2:
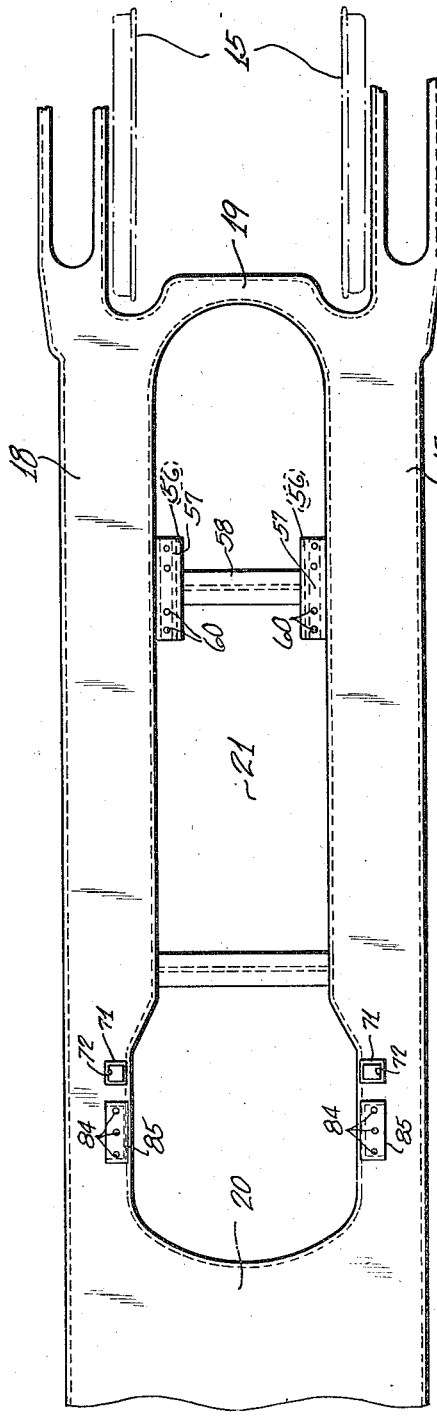
Figure 3:
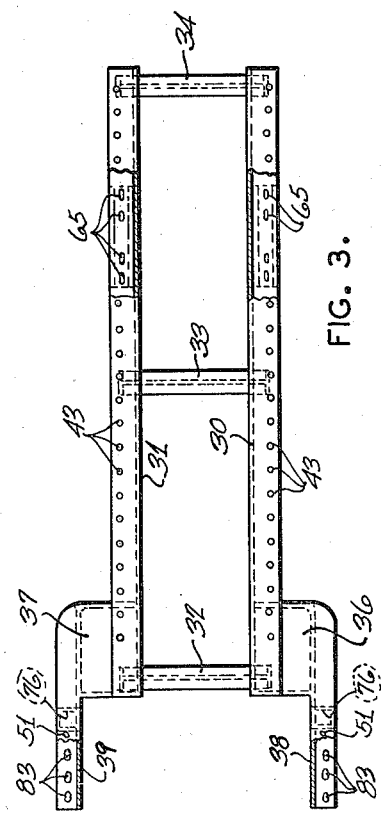
Figure 4:
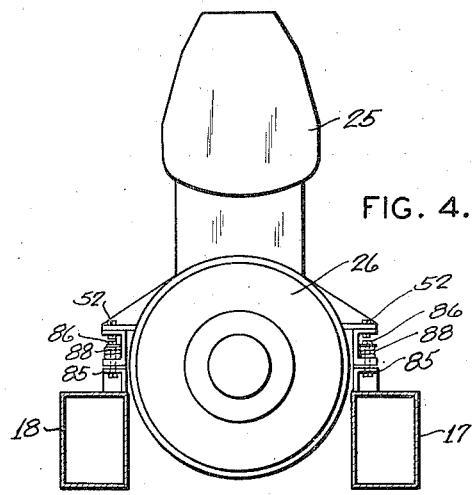
Figure 5:
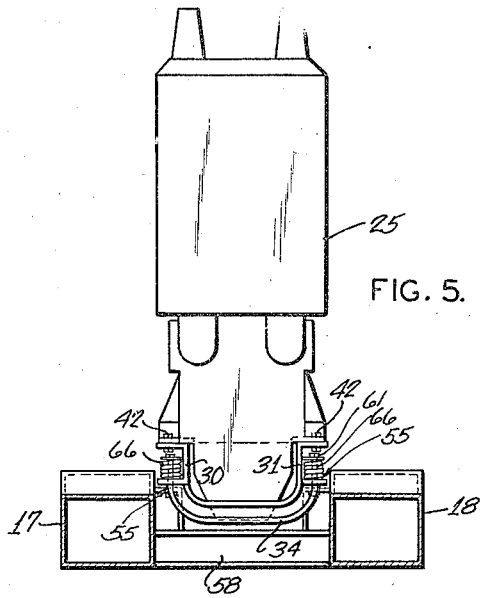
Figure 6:
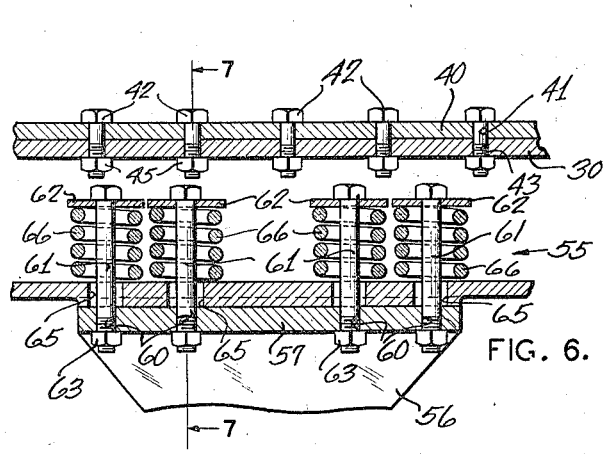
Figure 7:
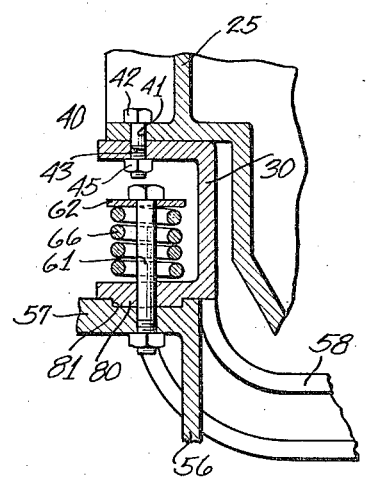
Figures 8, 9:
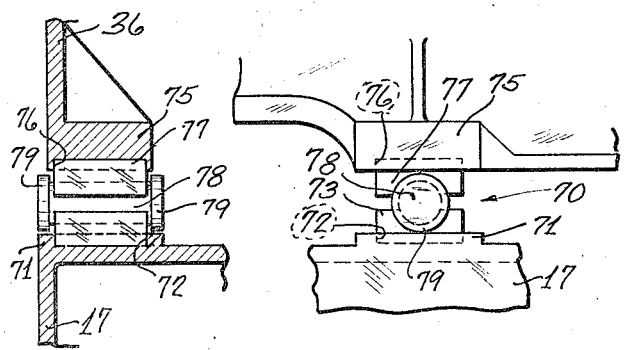

The foregoing and numerous other advantages will more readily appear from the following detailed description of a preferred exemplary embodiment of the invention, and from the accompanying drawings, in which:

Fig. 1 is a side elevation of a locomotive frame on which is mounted a Diesel-electric power plant, in accordance with present invention, the super-structure and end portions of the locomotive having been broken away or omitted for clearness; Fig. 2 is a top or plan view of the underframe and frame portions shown in Fig. 1; Fig. 3 is a top or plan view of a mounting cradle constructed in accordance with the present invention, certain portions being broken away for clearness of showing of some of the securement features; Fig. 4 is a transverse sectional elevation of the arrangement as viewed along line 4—4 of Fig. 1; Fig. 5 is a transverse sectional elevation through the assembly of Fig. 1, and as taken along line 5—5 thereof; Fig. 6 is an enlarged sectional elevation showing certain details of a slidable form of connection employed between the sides of the cradle and the vehicle underframe; Fig. 7 is a fragmentary transverse section of the arrangement shown by Fig. 6 and as viewed along line 7—7 thereof; Fig. 8 is a fragmentary vertical section in a plane crosswise of one side of the locomotive and illustrating a form of pivotal connection utilized between the mounting cradle and the underframe; Fig. 9 is a fragmentary side elevation, being an end view of the arrangement shown by Fig. 8, and Fig. 10 is a diagram representing the bending moments throughout the powerplant mounting cradle.

Referring now by characters of reference to the drawings, only those portions of the locomotive or self-propelled vehicle are shown, which are pertinent to a description of the invention. In reference to Fig. 1, one of the drive wheels is indicated at 15, and will be provided with the usual powered axle to which is directly connected or otherwise operatively associated, an armature or rotor of the electric motor or motors (not shown). The opposite end of the frame is rotatably supported as through a pony or trailer wheel 16. Supported between the wheel and axle assemblies 15 and 16 is the underframe, formed for example, of a malleable steel casting, which preferably comprises, as best appears in Fig. 2, a pair of longitudinal or sill elements 17 and 18. These are connected near the ends of the structures shown, as through end sills or bridge members 19 and 20. When the underframe structure is formed as by casting, the elements 17, 18, 19 and 20, due to the width of the longitudinal or sill elements, coact to form an imperforate deck structure extending about a central aperture 21 for the reception of the lower portions of the power plant and preferably a mounting cradle for the power plant, as is hereinafter more fully described.

As exemplifying a type of power plant to which the present invention is particularly applicable, there is shown and indicated generally at 25 a vertical, multi-cylinder, in-line type of engine which for conformity with actual practice, is of opposed-piston type characterized by both upper and lower crankshafts (not shown), operatively interconnected in timed relation as will be well understood in the art. For the purpose of generation of electrical energy there is provided an electric generator 26, provided with an exciter 27, connection being made between the lower crankshaft of engine 25, and the shaft of generator 26, as through a flexible coupling 28, the latter, for convenience, being shown only diagrammatically so as to designate its location with reasonable accuracy. Any suitable type of coupling may be employed.

Proceeding now to a description of the mounting cradle per se, and shown in plan view by Fig. 3, this consists of a pair of substantially parallel cradle sills 30 and 31. These are conveniently formed of a heavy structural steel stock, but if preferred, may be formed as parts of a single or composite casting constituting the cradle. If constructed of the heavy steel stock, the members 30 and 31 are preferably of C or U section, as will appear from Figs. 4, 5 and 7. The sill members 30 and 31 of the cradle are assembled in substantially fixed parallelism through a plurality, shown as three, of U-shaped tie bars or distance pieces 32, 33 and 34. These may be secured by welding or riveting, in case the cradle is fabricated, or may be cast integrally with the sill members, if the cradle is formed, say, of a malleable steel casting.

As best appears from Fig. 3, the left hand end of the cradle, (which may be either the forward or rear end of the frame since locomotives of this type are generally adapted for operation in either direction), is provided with a pair of laterally and endwise projected arms 36 and 37. The manner of securement of these arms to the sill members will obviously depend upon whether the cradle is constructed as a casting, or is of fabricated type. If the former, the arms 36 and 37 may obviously be cast with the sills; if the latter, they may be securely riveted or welded or otherwise attached to the ends of the sills. The terminal extensions 38 and 39 respectively formed on the arms 36 and 37 are, by preference, but depending upon the specific design of the engine and generator frame, somewhat raised with respect to the plane of the sills 30 and 31, this latter feature best appearing from the side view of Fig. 1. It will have appeared from the drawing that the arm portions 36—38 and 37—39 serve primarily as a support for the generator 26, which is direct-connected to the engine 25, as through the flexible coupling 28.

As to dimensions and proportions of the cradle, these factors are determined in accordance with the type of engine; if this be of multi-cylinder in-line type as shown, it is preferred that the cradle extend over substantially the greater part of the length of the engine, particularly that the sill elements 30 and 31 be of such extent, the greater width and height of the arms 36—38 and 37—39 being adapted for generator support, and extended beyond the sill members to a degree necessary to care for the predetermined type of generator frame and axial dimensions of the electric machine.

Before discussing the preferred manner of assembly of the cradle to the engine, and of the cradle to the locomotive underframe, it is noted as a preference that the longitudinal or sill elements of the vehicle underframe, such as 17 and 18, be formed of somewhat greater depth in those portions immediately underlying the cradle and the power plant, as will readily appear from the showing of element 17 in Fig. 1. The exact conformity, in shape and proportioning of the underframe, may however be varied within the distinct purview of the invention, according to different locations of the locomotive motors, drive wheels, etc. with respect to the power plant. It is noted that the depth of the underframe elements in the design shown by the drawing, provides for and permits a location of the engine base portions and lower case structure, as well as the lower portions of the mounting cradle, substantially between, rather than entirely above the longitudinal members 17 and 18 of the underframe. It will appear that the transverse tie bars 32, 33 and 34 of the cradle are, according to this arrangement, disposed entirely between the underframe elements 17 and 18. It is further noted that the substantially U-shape which results from the drop in each of these tie bars, permits an anchorage of the mounting cradle laterally of the engine and generator, substantially above the lowermost portion of the case, and at the same time provides for a definite transverse resilience of the cradle, since, because of the drop or curve in these elements, some transverse expansion of the engine due to thermal effects, is absorbed by the transverse resilience of the tie elements 32, 33 and 34 in better manner than were these pieces rectilinear, and disposed substantially in the same plane as the sill members 30 and 31.

Proceeding now to a description of the manner of securement of the mounting cradle to the engine, there is provided on each side of the engine a mounting flange 40 extending longitudinally of the case or base portion of the engine, and each of the flanges 40 is provided with a plurality of spaced bolt openings 41 for the reception of attachment bolts 42. A corresponding row of bolt openings 43 is provided in each of the cradle sills 30 and 31, the openings 43 being in register with those indicated at 41. The side C bars or U bars of the frame having their channels outwardly presented, are readily accessible during assembly for application of nuts 45, each engaging one of the hold-down bolts 42. It is preferred that the side elements of the cradle be securely anchored to the sides of the engine case or base through the use of the plurality of bolts as shown and described, or by other suitable fastening means.

The foregoing applies particularly to the manner of securement of the engine to its mounting cradle; however, a similar provision is made for securement of the generator 26 to the terminal portions 38—39 of the arms of the cradle, in this case the generator being provided with lateral, horizontally projecting flanges 50, one of which is shown in Fig. 1, the flanges 50 being seated upon the portions 38 and 39. Each flange 50 as well as the terminal arm is provided with a plurality of bolt openings 51 for the reception of hold-down bolts 52. It will readily appear that the elements 38, 50, 51 and 52 for example, serve to effect a relatively rigid assembly of the generator to the arms of the cradle.

Proceeding now to describe the provisions for structural assembly of the cradle to the locomotive underframe, it is a preference to provide for a movable connection between the cradle and vehicle underframe, in at least four zones or points; the anchorage in two of such zones, one on each side of the locomotive and cradle, is in the nature of a yieldably retained, slidable connection, while the anchorage in two other zones, one on each side of the locomotive and cradle, are in the nature of pivoted connections, as will more particularly hereinafter appear.

The preferred agencies for effecting a resilient, yet longitudinally slidable connection between the mounting cradle and the underframe, are best illustrated generally by the assembly 55 (Fig. 1), the details of which are shown by the somewhat enlarged sections of Figs. 6 and 7. In each of these zones, there being one at each side of the cradle and on each side of the underframe, there is provided a reinforced supporting structure consisting of a web 56 terminating in an inturned horizontal flange 57, the paired webs 56 being connected across the underframe by a frame tie member 58. Each of the horizontal flange portions 57 is provided with a plurality (shown as four) of bolt apertures 60, each for the reception of a holding bolt 61 provided with a washer or the like 62, below the bolt head and a nut 63. These hold-down bolts 61 also extend through slotted apertures 65 in the lower element of the adjacent cradle sill, the opening 65 being slotted longitudinally of the vehicle and of the cradle sill, for the purpose of permitting free expansion and contraction of the cradle, with the power plant structure, particularly the engine. Surrounding each of the hold-down bolts 61 and under a slight compression between the associated washer 62 and the lower element of the cradle sill, is a compression spring 66; the springs coact in keeping the hold-down bolts 61 under a reasonable tension at all times. It is however a distinct preference that the loading of the springs 66 be such as to provide for free floating movement, in a vertical plane, of the associated portion of the cradle and engine assembly, and yet permit free longitudinal sliding movement of the cradle and engine assembly, on the underframe. It will appear as obvious that the two assemblies bearing respectively on the horizontal flange elements 57, are or may be identical in construction except for a relatively reversed mounting, hence the detailed description of one thereof will serve to cover both.

It will have appeared from the drawings that the primary support of the power plant assembly is derived as a result of the pivotal relation between the power-plant-cradle assembly and the underframe, so as to provide what may, in effect, be termed a cantilever relation of the power plant to the subjacent frame parts. The pivotal relation between the cradle and underframe occurs through the assembly generally indicated at one side of the vehicle and cradle, at 70, the details of this connection best appearing in Figs. 8 and 9. For purposes of permitting a limited journalling movement between the parts, the underframe element, for example 17, is provided with a boss or projection 71 which is rectangularly recessed as at 72 for the reception of a half-bearing block 73. In similar manner each of the arms 36—37 is provided with a reinforced portion 75, the under surface of which is rectangularly undercut to provide a recess 76 for the positive retention in assembly, of a companion half-bearing block 77. Each of the blocks 73 and 77 is characterized by a part cylindrical recess for the reception of a pivot spool 78, being a pin provided at each of its ends with a head or enlargement 79. It is a distinct preference that the paired bearing blocks 73 and 77 be substantially spaced from each other as appears in Fig. 9, so as to permit a rocking movement of either of these blocks relative to the other, and about the associated spool 78. It is also a preference that the axial dimension of each of the pivot spools 78, between its heads 79, somewhat exceed the corresponding dimensions of the bearing blocks, for the purpose particularly of permitting a desirable degree of lateral expansion of the engine and cradle, without any restriction to such movement as a result of the pivot assemblies. It will appear from the foregoing description of the journalling assemblies, that the structurally combined cradle and power plant are free for a limited, but desirable lateral movement relative to the underframe or, conversely stated, that the underframe may be given a limited lateral movement with respect to the engine-cradle assembly; this same relation applying as to the pivotal connection between the two relatively rigid structures.

It has been found further desirable, in connection with the provision for the resiliently assembled, slidable connections between the cradle and the underframe, as through the assemblies 55, to provide, through this zone on the under surface of the cradle, a guide projection best appearing in Fig. 7 and indicated at 80. Cooperating with the projection 80, is a guide groove or channel 81 formed, for example, in the associated flange 57, whereby, even though the cradle is permitted a longitudinal movement over the underframe, it is yet yieldably restrained against a prohibitive lateral movement. If so desired, the guide grooves 81 may be so proportioned as to permit a desirable lateral expansion movement of the cradle due to thermal effects imparted by the engine in warming or cooling.

As will best appear from Fig. 1, the generator end, or overhanging end of the cradle beyond the pivot assembly 70, is also, by preference, yieldably and slidably secured to the underframe. The structural detail by which this relation is attained is or may be generally similar to the provisions made in the case of the assembly 55, but is shown as involving the use of only three hold-down bolt- and spring-assemblies, at each side of the generator. For this purpose, the underframe sill portion, for example 17, is provided with a somewhat elevated step or projection 85 provided with bolt apertures 84, the adjacent lower flange portion of the cradle being provided with companion, slotted openings 83, which may be similar in form to the openings 65 (Fig. 6). A yieldable yet slidable hold-down provision in this zone is afforded by a series of bolts 86, washers 87 and springs 88. A difference preferably exists between this provision and the assembly 55, in that there is a clearance between the cradle arms 38 and 39 and the bolt supports 85, since the entire load at the pivoted end of the cradle is carried by the assemblies 70.

The advantages of the structural provisions characterizing the present invention, and their functions during operation of the power plant and locomotive, are thought to have been obvious from the foregoing description and to require no further detailed discussion. It may be noted however as a preference, to provide the pivot zones substantially as shown and described, i. e., such that the axis of cradle rocking movement is between the generator and the engine, as readily appears in Fig. 1. Moreover, the arrangement of the power plant relative to the cradle and its pivotal axis, is such that the centers of mass of the engine and generator are so applied to the cradle that the portion of the cradle adjacent its pivotal support and in the zone of the flexible coupling between the engine and generator, is substantially free of any bending stress. This result is best shown by the bending moment diagram of Fig. 10, wherein the curve 100 as plotted upon the horizontal, zero bending moment reference line 101, represents the bending moments throughout the cradle structure shown by Fig. 3. The moment diagram illustrated, applies specifically to the cradle mounting arrangement as shown in Fig. 1, with the engine 25 and generator 26 supported thereon in the relative positions shown, and wherein the weight of the engine is substantially two and one-half times as great as the weight of the generator. Moreover, to facilitate complete understanding of the arrangement, the line 101 may be considered to represent the cradle structure, so that the curve 100 indicates directly the bending moments in the several sections or portions of the cradle. Accordingly, referring to Fig. 10, the bending moments in that portion of the cradle directly supporting the engine 25, are represented by the section of the curve 100 between the vertical reference lines A and C, while the bending moments in the portion of the cradle supporting the generator 26, are represented by the section of the curve between the vertical reference lines E and G. The vertical reference line B locates that portion of the cradle in the zone of sliding support thereof on the locomotive under frame, and indicates by the curve at this point, the bending moments therein, while the reference line E indicates the cradle bending moment in the zone of the cradle pivotal support, as at 70 in Fig. 1. The remaining reference line D indicates the bending moment of that portion of the cradle in the zone of the flexible coupling 28 connecting the engine and generator, and as shown in the diagram, the curve 100 intersects the line 101 at this point. Thus the bending moment is substantially zero in this section of the cradle.

It will be readily understood from the foregoing, that given the weights of the engine and generator units of the power plant, the power plant may be so arranged and supported on the cradle, and the cradle pivot and sliding supports so located relative to the cradle and the power plant, as to effect a minimum or substantially zero bending moment in the portion of the cradle in the zone of the engine-generator coupling. Since the engine bed is bolted to the cradle substantially from end to end thereof, that portion of the cradle which extends beyond the engine frame, will result in the equivalent of a fixed end; accordingly, the location of the generator with respect to the cradle is such that the center of gravity of the generator is beyond the pivot axis of the cradle, and there results a relatively small stress in the cradle between the engine and the support. This arrangement is of advantage in that the flexible coupling 28, utilized between the engine and generator shafts, will have very little to do since these shafts are at all times substantially in true alignment. Due to the described manner of mounting the cradle, the minimum mis-alignment of engine and generator shafts results, since any bending stresses in the underframe of the locomotive or vehicle, will never be transmitted to the mounting cradle nor to the engine frame or bed. The assembly in fact results in an entire avoidance of any hazard of engine bearing distortion or mis-alignment as a result of stresses in the vehicle underframe proper.

It is to be noted that the described manner of flexibly and floatingly supporting the engine-generator assembly, enables the entire structure to be considerably reduced in weight over heretofore prevailing forms of construction, and further permits the greater portion of the cradle and substantially the greater portion of the engine base, to project below the top surface of the vehicle underframe or deck structure.

It will be noted that, as a result of the described manner of relatively rigidly assembling the mounting cradle and engine, this assembly being in turn cantilevered on the underframe, the holding bolts between the cradle and vehicle underframe are rarely ever, or for any protracted periods, under any substantial stresses, since the chief purpose of all of the bolts between the cradle and underframe is for retention of the power plant in position during severe shocks or wrecks. It is noted that the several springs on the hold-down bolts are by preference, never set up entirely solidly, but are kept only under sufficient loading to maintain the engine-cradle assembly in position for usual operating conditions.

Since in the event of twisting stresses imparted to the vehicle underframe, it is possible for the spring mounting assemblies to permit differential movements on the opposite sides of the vehicle, the described arrangement results in a considerably higher degree of elasticity in the whole structure than is possible when the engine bed or frame is directly bolted to the underframe of the locomotive.

It will appear obvious to those skilled in the art that the arrangement described, serves fully to attain each of the several objectives hereinabove specifically recited, as well as the numerous advantages implied from the foregoing description.

Although the invention has been described by making detailed reference to a presently preferred exemplary embodiment, numerous changes may be made in the several parts, in their assemblies, as well as in their subcombinations, without departing from the full intended spirit and scope of the invention as defined by the claims hereunto appended.

I claim as my invention:

1. The combination in a Diesel-electric locomotive or the like, of a relatively rigid underframe, a power plant including a direct-connected engine and generator, a flexible coupling between the engine and generator, a mounting cradle including sill elements respectively rigidly secured to opposite sides of the power plant, means forming a pivotal connection between the mounting cradle and the underframe, said pivotal means being located intermediate the ends of the cradle and in the zone of said flexible coupling, whereby the power plant is structurally associated with the underframe to permit rocking movement thereof on the underframe about a single axis disposed transversely of the underframe, means near one end of the cradle, providing a resiliently retained slidable connection of the said end of the cradle to the underframe, and means near the opposite end of the cradle, providing a yieldable anchorage of such end to the underframe.

2. The combination in a Diesel-electric locomotive or the like, of a relatively rigid underframe, a power plant including an engine and a generator, a flexible coupling between the engine and generator, a mounting cradle including sill elements respectively secured to opposite sides of the engine and generator, means located inwardly of one end of the cradle and in the zone of said flexible coupling, forming a pivotal support therefor upon the underframe, means adjacent said pivotal support, providing a yieldable anchorage of the cradle to the underframe, and means near the opposite end of the cradle, providing a resilient and slidable support therefor upon the underframe, the arrangement of the power plant relative to the cradle, being predetermined such that the centers of mass of the engine and generator are so applied upon the cradle on opposite sides of said cradle pivotal support, as to preclude any substantial bending stress in the section of the cradle adjacent to and in the zone of said flexible coupling.

3. In a Diesel-electric locomotive or the like, a relatively rigid underframe, a power plant including an engine and a generator, a flexible coupling between the engine and generator, a mounting cradle for the power plant to which the engine and generator are rigidly secured, means forming a pivotal support for the cradle upon the underframe, said means being located inwardly of one end of the cradle and in the zone of said flexible coupling, said cradle near its opposite end, slidably engaging a portion of said underframe, means including spring-urged elements yieldably retaining said cradle end portion in slidable engagement with the underframe and serving to limit relative displacement therebetween, and means including spring-urged elements, located near said one end of the cradle, providing a yieldable anchorage of said end to the underframe, the arrangement of the power plant relative to the cradle, being predetermined such that the centers of mass of the engine and generator are so applied upon the cradle on opposite sides of said cradle pivotal support, that the portion of the cradle adjacent said pivotal support therefor and in the zone of said flexible coupling, is substantially free of any bending stress.

4. The combination in a Diesel-electric locomotive or the like, of a relatively rigid underframe, a power plant including an engine and generator in axial alignment, a flexible coupling between the engine and generator, a mounting cradle to which said power plant is rigidly secured, means providing a pivotal support for the cradle upon the underframe, said pivotal support being located intermediate the ends of the cradle and in the zone of said flexible coupling, thereby permitting rocking movement of the cradle on the underframe about a single axis disposed transversely of the underframe, means near one end of the cradle, forming a resiliently retained slidable connection of the said end to the underframe, and means near the opposite end of the cradle, providing a yieldable anchorage thereof to the underframe, said power plant being arranged relative to said mounting cradle, such that the centers of mass of the engine and generator are effective at predetermined zones of the cradle, on opposite sides of said cradle pivotal support, and said pivotal support, slidable connection and yieldable anchorage providing the cradle support on the underframe, being located and applied to the cradle, as determined by the said arrangement of the power plant relative to the cradle, whereby to preclude any substantial bending stress in the section of the cradle adjacent to and in the zone of said flexible coupling.

LOUIS E. ENDSLEY.